United States Patent [19]

Kyburz

[11] Patent Number: 4,540,198
[45] Date of Patent: Sep. 10, 1985

[54] SKI-TRANSPORTING DEVICE

[76] Inventor: Hans Kyburz, Bruggweg 40, CH-4143 Dornach, Switzerland

[21] Appl. No.: 468,052
[22] PCT Filed: Jun. 17, 1982
[86] PCT No.: PCT/CH82/00079
    § 371 Date: Feb. 16, 1983
    § 102(e) Date: Feb. 16, 1983
[87] PCT Pub. No.: WO82/04401
    PCT Pub. Date: Dec. 23, 1982

[30] Foreign Application Priority Data

Jun. 18, 1981 [CH] Switzerland .......................... 4056/81

[51] Int. Cl.³ .............................................. A63C 11/10
[52] U.S. Cl. ..................................... 280/814; 188/1.12; 280/47.13 R
[58] Field of Search ........................ 280/47.13 R, 814; 188/1.12, 2 F, 58, 31, 60, 69, 136

[56] References Cited

U.S. PATENT DOCUMENTS 918,636 4/1909 Young .................................. 188/1.12

FOREIGN PATENT DOCUMENTS

| 2471796 | 6/1981 | France | 280/814 |
| 298456 | 7/1954 | Switzerland | 188/1.12 |
| 418201 | 2/1967 | Switzerland | 280/47.13 R |
| 451775 | 5/1968 | Switzerland | 280/814 |
| 581487 | 11/1976 | Switzerland | 280/814 |

Primary Examiner—Joseph F. Peters, Jr.
Assistant Examiner—Ross Weaver
Attorney, Agent, or Firm—Ladas & Parry

[57] ABSTRACT

On the lower end section of a pair of skis (S), a roller device is fitted which comprises a holder (1), which can be detachably fixed to the ski, and a loosely and rotatably mounted roller (2). The holder can be inserted between the two skis until its lower stop strip (9) strikes the lower ski edge. Further stops (10 to 13) are provided for lateral securing.

The holder is secured by means of a commercially available ski-securing strap (3), the steel tongue of which engages in a groove provided in the holder.

In this way, the roller (2) is securely anchored to the skis and nevertheless projects only a little beyond the lower edge of the skis.

9 Claims, 10 Drawing Figures

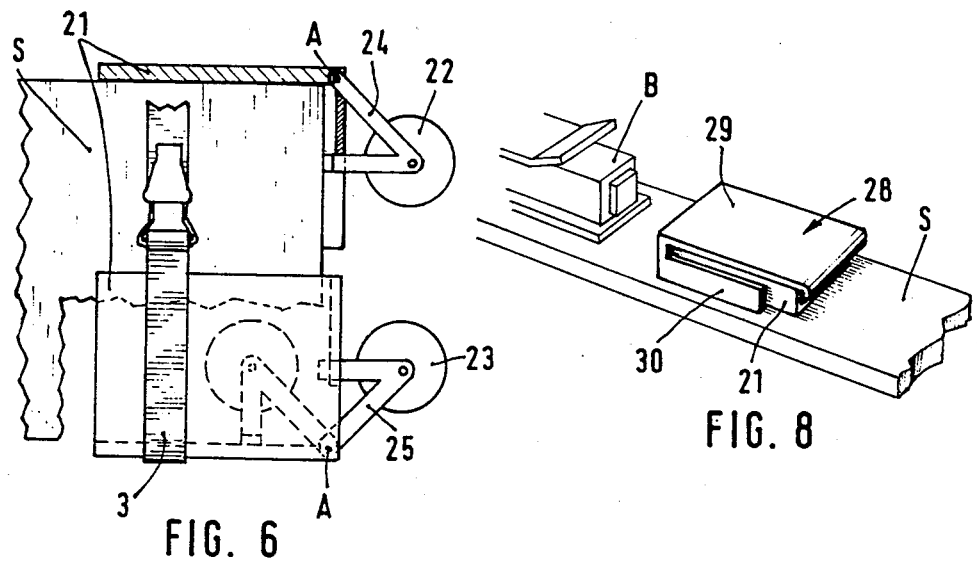
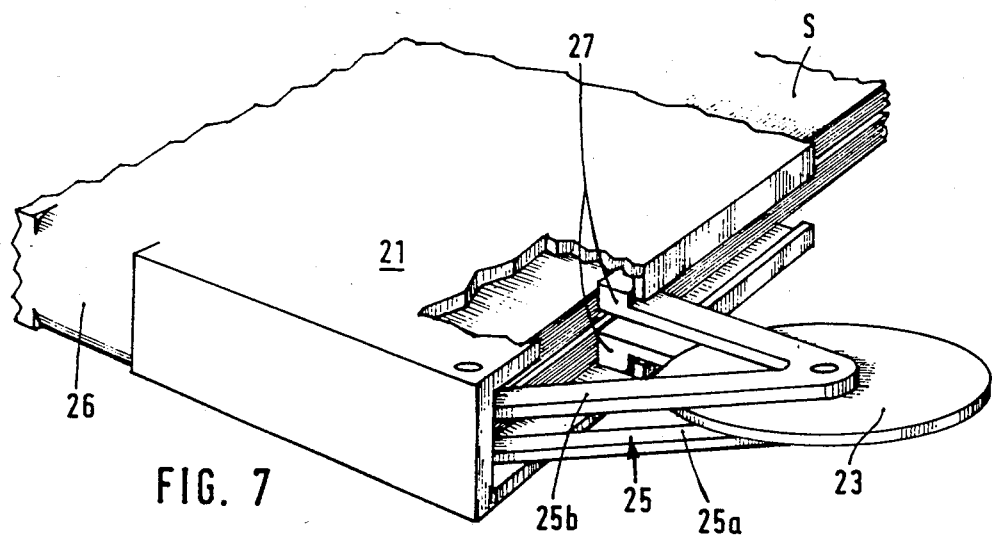

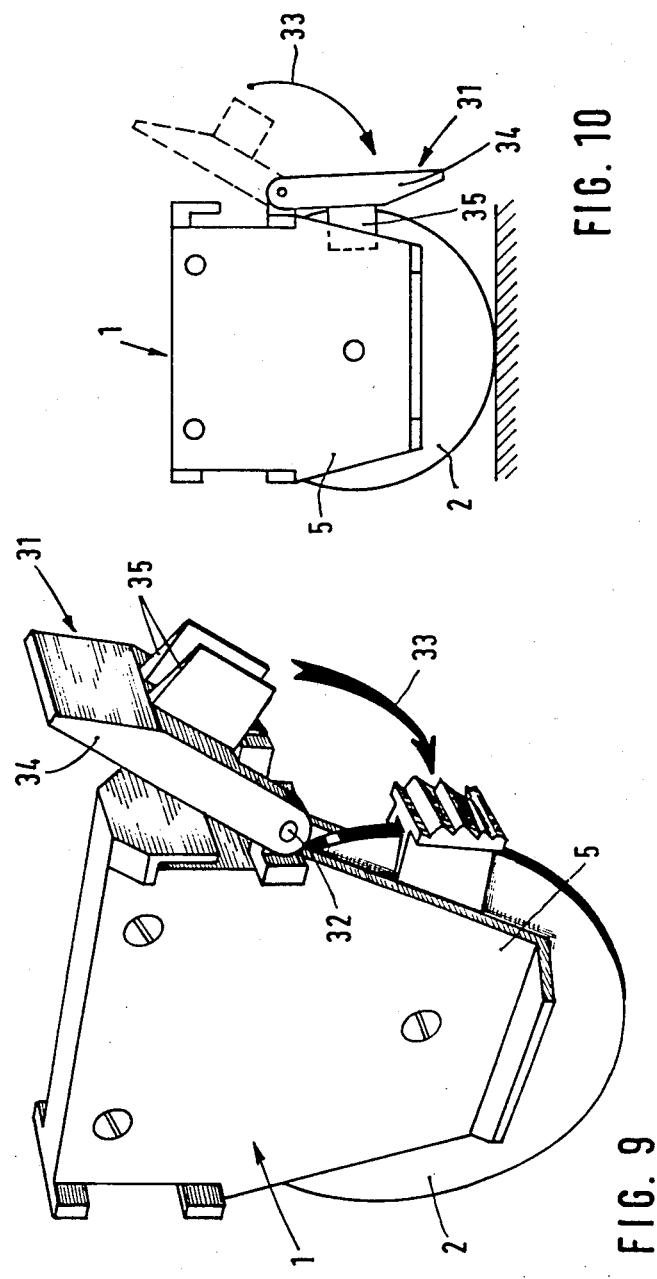

SKI-TRANSPORTING DEVICE

The present invention relates to a ski-transporting device, having a loosely and rotatably mounted roller which is detachably fitted to the end section of a pair of skis remote from the tips and hence permits the skis to be rolled along on the ground.

As is known, the transport of skis by pedestrians is a hazardous matter, in particular when the skis are carried on the shoulder, as is usual, in such a way that the ski tips project rearwards virtually at head level. To reduce the associated risk of injury, it has already been proposed to fit a loosely and rotatably mounted roller to the end section of the pair of skis remote from the tips. To fix this roller, a holder is here used which is pushed over the skis in such a way that the roller is entirely outside the holder. On the other hand, this has the consequence that, due to the attachment of the roller, the skis become relatively long or a roller of relatively small diameter must be used. The type of anchoring of the holder to the skis also still leaves something to be desired.

It is therefore the object of the present invention to propose a ski-transporting device which permits the roller to be held securely on the end section of the pair of skis and yet to be readily detachable, it being intended that the major part of the diameter of the roller be still within the ski contours.

According to the present invention, this object is achieved by the combination of features, defined in the independent patent claim 1. Preferred embodiments are defined in the dependent patent claims.

In the following text, an illustrative embodiment of the subject of the invention is described by reference to the attached drawings, in which.

Figure 5:
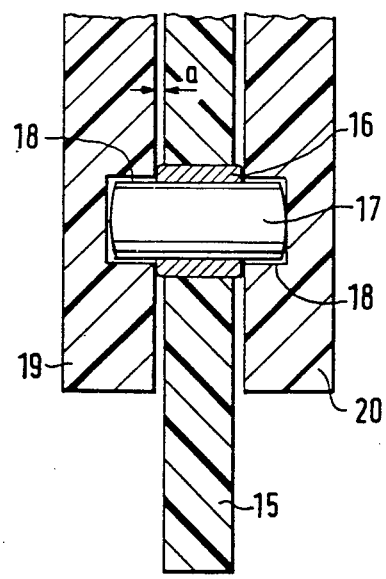
Figure 3:
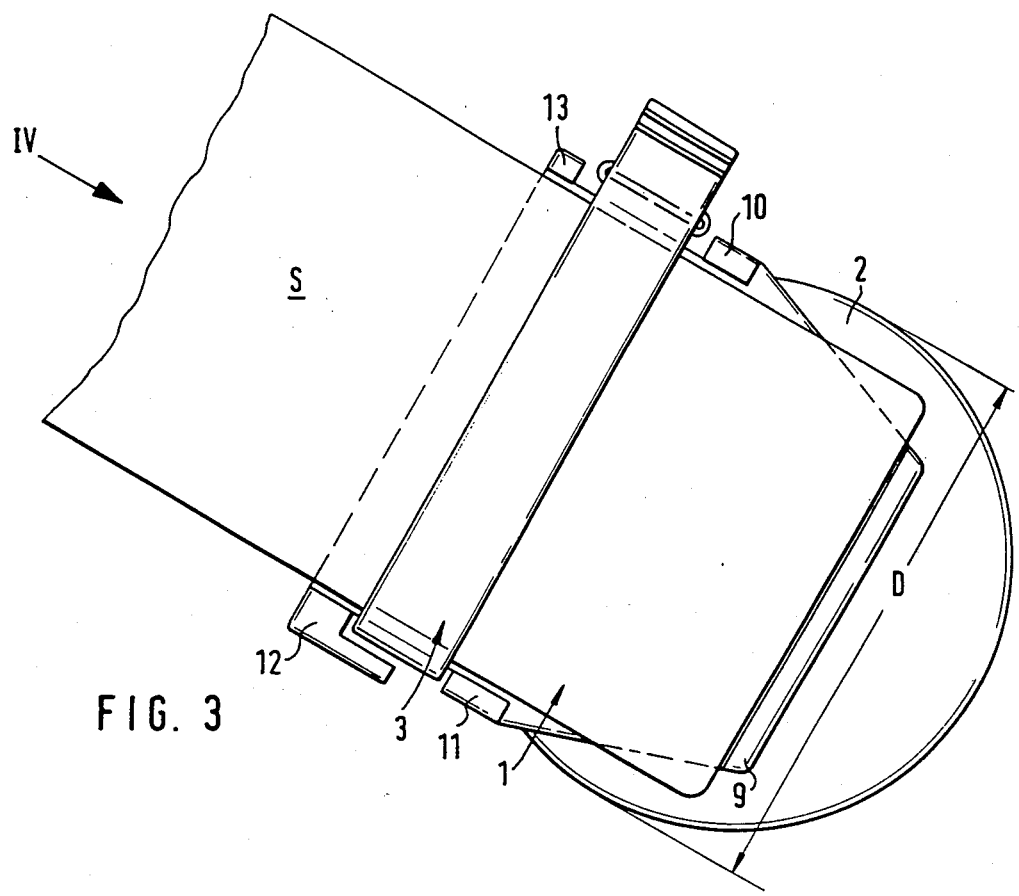
Figure 4:
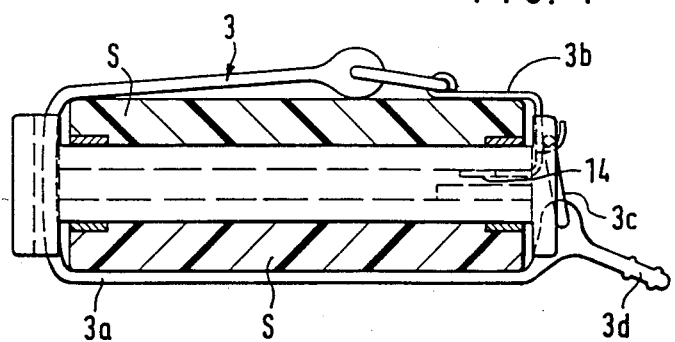

FIG. 3 shows the same device in the mounted state on the lower end section of a pair of skis, FIG. 4 shows a view in the direction of the arrow IV in FIG. 3, FIG. 5 shows a partial section of a variant, FIG. 6 shows a view, partially cut open, of a variant, FIG. 7 shows a part representation of this variant, shown partially in section, FIG. 8 illustrates the fitting of the embodiment according to FIGS. 6 and 7 on the ski, and FIGS. 9 and 10 show a possibility for blocking the wheel, in perspective and in side view respectively.

Figure 2:
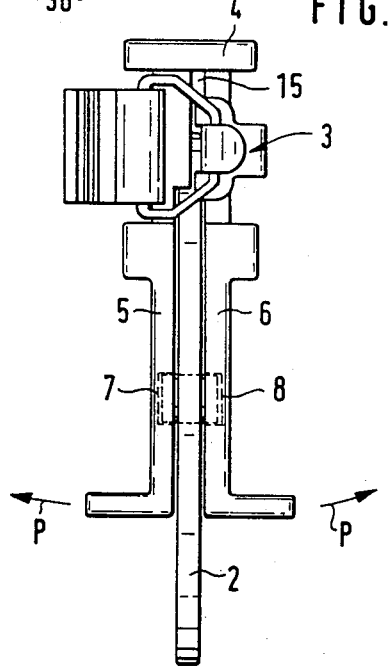
FIG. 2 shows the associated end view.

At the lower end section of a pair of skis, marked S in FIG. 3, a device is fixed which comprises a holder 1, a roller 2 and a securing strap 3. As shown in particular by FIG. 2, the holder 1 has a U-shaped cross-section and accordingly has an upper web 4, from the underside of which two side cheeks 5 and 6 project downwards in parallel. The two side cheeks 5 and 6 are located at such a mutual distance that they leave just enough space for introducing the roller 2. In each side cheek, a blind bore 7 or 8 (FIG. 2) is provided, into which the roller axis fits. With respect to the thickness of material and type of material, the two side cheeks 5 and 6 are selected in such a way that they can be bent apart a little in the direction of the arrows P (FIG. 2) which makes it possible to mount the roller 2. The material of the two side cheeks 5 and 6 should therefore be selected in such a way that these elastically reassume their original position after they have been bent apart.

On their outsides facing away from the roller 2, the two side cheeks have stops, the positions of which fit the contours of the pair of skis. Thus, a stop strip 9, which is in contact with the lower ski edge, projects outwards from the lower rim of each side cheek. Moreover, on each side cheek, four further lateral stops, 10, 11, 12 and 13 are arranged, of which the stop faces, matching the ski contour, are marked F in FIG. 1.

Due to this design, the holder 1 can be inserted between the lower end sections of the two skis until the stop strips 9 strike the lower ski edges. The device has thus reached its working position required for the transport of the skis and must then still be secured to the pair of skis.

This securing is preferably effected by means of a commercially available ski-securing strap 3 which, as shown in particular in FIG. 4, is laid around both skis and thus presses the skis from the outside against the holder 1. The steel tongue, marked 14 in FIG. 4, of the securing strap 3 here projects into a groove 15 provided in the upper part of the holder.

The holder 1 is preferably made integrally from a wear-resistant plastic, for example a polyamide such as nylon. To enable the device to absorb partially the shocks occurring when rolling along on a bumpy path, the roller 2 preferably consists of an elastic material, for example a rubber-like thermoplastic.

The roller diameter D should correspond to at least half the ski width, but is preferably a little greater than the ski width to prevent the lower ski edges in the oblique transport position from scraping along the ground.

As also shown in FIG. 3, the roller 2 in the holder described projects beyond the lower ski edge only by the fraction B of the roller diameter.

The ski-securing strap 3 comprises, in the known manner, a rubber strap 3a (FIGS. 1 and 4), a metal tongue 3b bent round in itself by 180°, the eye-type counter-piece 3c for hooking in the tongue and the gripping tab 3d used for opening.

Guide grooves 22 which facilitate the insertion of the roller axis can be provided on the inner surfaces of the two cheeks 5 and 6.

According to FIG. 5, the roller 15 is provided with a hub 16 into which an axis 17 is loosely inserted. The axis 17 projects on both sides into blind bores 18 in the two cheeks 19 and 20 of the holder. The arrangement of the hub 16 ensures that the roller 15 is always at a certain distance "a" from the adjacent cheek surface. Since the axis 17 is not rigidly joined to the roller 15, the roller can freely rotate in the blind bores 18, independently of the friction of the axis.

The hub 16 on which the roller 15 runs can also be fitted to the inner surface of one of the two cheeks 19, 20, in which case a centering pin which projects into a centering bore in the hub can be provided on the opposite surface of the other cheek.

According to FIG. 6, the holder, here marked 21, is open at its lower end and is provided with two rollers 22 and 23 which are rotatably mounted on angle levers 24 and 25. Each angle lever in turn is mounted to be pivotable about an axis A on the holder, in such a way that it can be pressed into the recess located between the side cheeks of the holder and thus assumes the rest position indicated by broken lines in FIG. 6. On insertion of the ski S, its lower edge forces the rollers 22 and 23 outwards into the fully drawn position, whereupon the holder can be secured by means of a securing strap 3 in a groove 26 which is worked into the narrow sides of the holder. As FIG. 7 shows, the angle lever 25 has two parallel arms 25a and 25b, the free ends of which are provided with stops 27.

According to FIG. 8, a receiving device 28 is arranged on the top side of the ski, just behind the binding marked B, which receiving device corresponds in its shape to the outlines of the holder 21 and is composed of an elastic plastic, in such a way that the holder 21 can be put away in this receiving device and be carried along during skiing. The receiving device 28 thus acts like an elastic clamp which, by its upper tongue 29, grips over the holder 21 and secures it by means of the two lateral lugs 30.

FIGS. 9 and 10 illustrate a device additional to the embodiment of the subject of the invention, as shown in FIGS. 1 to 5. The reference numbers already introduced in these Figures have therefore been retained. Accordingly, a blocking device which as a whole is marked 31 and is pivotable about an axis 32 in the direction of the arrow 33 is provided on one narrow side of the holder 1. The blocking device has a base body 34 which is provided with two laterally projecting brake wedges 35. The mutual distance of the brake wedges corresponds approximately to the width of the wheel 2, and the thickness or tapering of the brake wedges is such that these insert themselves between the side cheeks 5 and 6 on the one hand and the wheel 2 on the other hand, when the blocking device is folded down in the direction of the arrow, and thus block the wheel. FIG. 10 shows the blocking device in this position in which the wheel 2 is locked and the ski can thus be put down without a risk of rolling away laterally.

Figure 1:
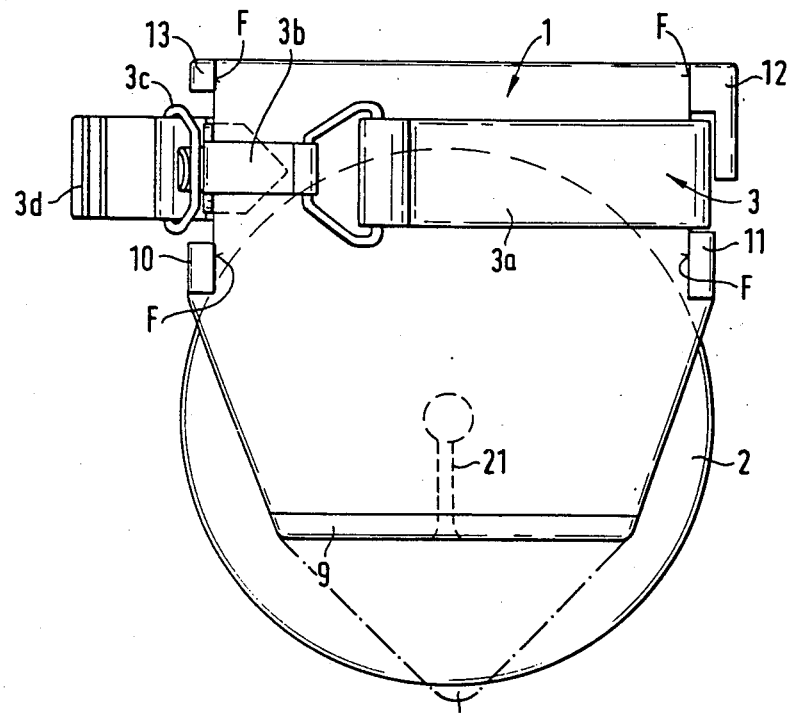
FIG. 1 shows a side view of such a device.

A simple variant of a blocking device is indicated in dots and dashes in FIG. 1. The cheeks 5/6 are here formed into a tip 36 which projects as far as the region of the lower wheel rim and supports the ski standing at an oblique angle.

I claim:

1. A ski-transporting device, having a loosely and rotatably mounted roller having a lower wheel rim which is detachably fitted to the end section of a pair of skis remote from the tips to permit the skis to be rolled along on the ground, wherein the roller is mounted in a holder of virtually U-shaped cross-section in such a way that two side cheeks of the holder cover the major part of the roller, the two side cheeks extend in the form of a tip downwards into the region of the lower wheel rim, to prevent lateral rolling away when the skis are put down and wherein at least one side cheek, on its outside facing away from the roller, has stops, the position of which fits the contours of the lower ski sections, and furthermore a holding element is provided which secures the holder to the lower section of the pair of skis, the whole arrangement being such that the holder can be inserted between the two skis and can be secured in this position by the holding element.

2. The device as claimed in claim 1, wherein each side cheek has an outward-projecting stop web on its lower rim and at least one further stop on each side rim.

3. The device as claimed in claim 1, wherein a recess for guiding an elastic strap is provided on each of the two flat sides of the holder, above the roller.

4. The device as claimed in claim 3, wherein the elastic strap is a commercially available ski-securing strap and the holder has, on one narrow side, a groove which is to receive the metal tongue of the ski-securing strap.

5. The device as claimed in claim 1, wherein the holder is selected with respect to thickness and/or material in such a way that the two side cheeks provided with bores for receiving the roller axis can be bent apart elastically for mounting the roller.

6. The device as claimed in claim 1, wherein the roller is composed of an elastic material, for example rubber, in order to absorb the bumps occurring in transporting skis.

7. The device as claimed in claim 1, wherein the holder is made integrally from a wear-resistant plastic, in particular a polyamide.

8. The device as claimed in claim 1, wherein the diameter of the roller is greater than the width of the skis.

9. the device as claimed in claim 1 wherein the stop which is provided for the end contour of the ski is positioned below the axis of the roller.

* * * * *